(12) United States Patent
Yun et al.

(10) Patent No.: US 12,345,872 B2
(45) Date of Patent: Jul. 1, 2025

(54) REFLECTIVE HOLLOW SINGLET FOLDED OPTICAL LENS STRUCTURE

(71) Applicant: Meta Platforms Technologies, LLC, Menlo Park, CA (US)

(72) Inventors: Zhisheng Yun, Sammamish, WA (US); Ying Geng, Bellevue, WA (US); Fei Liu, Los Altos, CA (US); Daozhi Wang, Dublin, CA (US); Yanming Zhao, Santa Clara, CA (US); Yusufu Njoni Bamaxam Sulai, Snohomish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 583 days.

(21) Appl. No.: 17/715,683

(22) Filed: Apr. 7, 2022

(65) Prior Publication Data

US 2023/0324669 A1  Oct. 12, 2023

(51) Int. Cl.
| | | |
|---|---|---|
| *G02B 25/00* | (2006.01) | |
| *G02B 5/30* | (2006.01) | |
| *G02B 27/00* | (2006.01) | |
| *G02B 27/01* | (2006.01) | |

(52) U.S. Cl.
CPC ......... *G02B 25/001* (2013.01); *G02B 5/3033* (2013.01); *G02B 5/3083* (2013.01); *G02B 27/0025* (2013.01); *G02B 27/0172* (2013.01); *G02B 2027/011* (2013.01)

(58) Field of Classification Search
CPC .. G02B 27/01; G02B 27/017; G02B 27/0101; G02B 27/0172; G02B 27/0178; G02B 27/0025; G02B 5/30; G02B 5/305; G02B 5/3033; G02B 5/3041; G02B 5/3058;
(Continued)

(56) References Cited

U.S. PATENT DOCUMENTS

| | | | |
|---|---|---|---|
| 10,451,947 B1 * | 10/2019 | Lu | G06F 1/163 |
| 10,509,228 B1 * | 12/2019 | Sulai | G02B 27/0172 |
| 2018/0239149 A1 * | 8/2018 | Yun | G02B 5/30 |

(Continued)

FOREIGN PATENT DOCUMENTS

| | | |
|---|---|---|
| CN | 213780542 U | 7/2021 |
| WO | 2021196746 A1 | 10/2021 |

OTHER PUBLICATIONS

International Search Report and Written Opinion for International Application No. PCT/US2023/017783, mailed Jul. 7, 2023, 9 pages.

(Continued)

*Primary Examiner* — Sultan Chowdhury
(74) *Attorney, Agent, or Firm* — Greenberg Traurig, LLP

(57) ABSTRACT

According to examples, an optical lens assembly for head-mount display (HMD) devices may include an optical lens configuration with a first optical element and a second optical element. The first optical element and the second optical element may be affixed together along a peripheral edge to form a gap between the two optical elements and may compensate chromatic dispersion characteristics. The optical lens configuration may also include a reflective polarizer layer, a quarter wave layer, and a semi-transparent mirror provided on selected surfaces of the optical elements. In some examples, the gap may be filled with air or an inert gas.

20 Claims, 13 Drawing Sheets

(58) Field of Classification Search
CPC .... G02B 5/3066; G02B 5/3083; G02B 25/00; G02B 25/001; G02B 25/004; G02B 25/008
See application file for complete search history.

(56) References Cited

U.S. PATENT DOCUMENTS

| | | | |
|---|---|---|---|
| 2019/0265493 A1* | 8/2019 | Takagi | G02B 27/0172 |
| 2019/0384045 A1* | 12/2019 | Yun | G02B 27/28 |
| 2020/0041795 A1* | 2/2020 | Yamaguchi | G02B 3/08 |
| 2020/0096770 A1 | 3/2020 | Pedder et al. | |
| 2020/0096817 A1 | 3/2020 | Richards et al. | |
| 2020/0192079 A1* | 6/2020 | Tohara | G02B 27/0172 |

OTHER PUBLICATIONS

International Preliminary Report on Patentability for International Application No. PCT/US2023/017783, mailed Oct. 17, 2024, 7 pages.

* cited by examiner

US 12,345,872 B2

REFLECTIVE HOLLOW SINGLET FOLDED OPTICAL LENS STRUCTURE

TECHNICAL FIELD

This patent application relates generally to compact and low-profile display systems, and more specifically, to a head-mount display (HMD) device using an optical lens configuration referred to as a hollow singlet optical lens structure.

BACKGROUND

A head-mounted display (HMD) may be a headset or eyewear used for video playback, gaming, or sports, and in a number of contexts and applications, such as virtual reality (VR), augmented reality (AR), and/or mixed reality (MR). A head-mounted display (HMD) device may communicate information to or from a user who is wearing the headset. For example, a virtual reality (VR) headset may be used to present visual information to simulate any number of virtual environments when worn by a user. That same virtual reality (VR) headset may also receive information from the user's eye movements, head/body shifts, voice, or other user-provided signals.

A conventional head-mounted display (HMD) device, however, relies on optical configurations that are typically large and bulky. As head-mounted displays (HMDs) are generally worn on users' heads for prolonged periods, it is becoming more important to emphasize and improve upon head-mounted display (HMD) device characteristics, such as compactness, weight, and optical performance, especially in design and implementation. However, improving optical performance may typically involve increasing the number or size of optical components, which in turn may create or add more bulk and weight. Other head-mounted displays (HMDs) may have optical configurations that improve compactness and reduce size and weight, but these conventional display devices, having fewer optical components, may often have decreased optical resolution or visual acuity, such as limitations with central and/or peripheral fields of view (FOVs) for the user.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
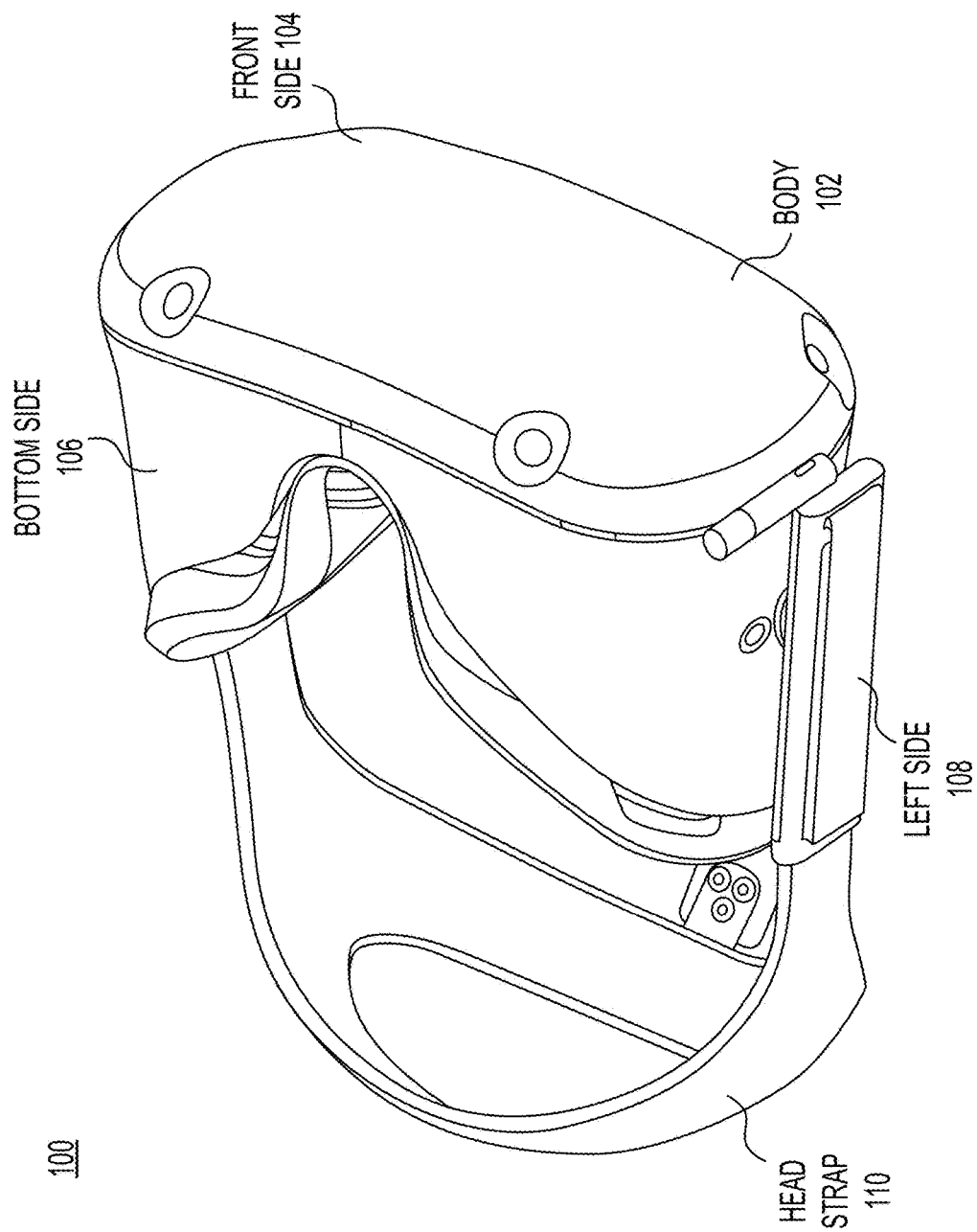
FIG. 1 illustrates a head-mounted display (HMD) device 100, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As discussed herein, head-mounted displays (HMDs) may include optical configurations that are typically large and bulky, and therefore, may be vulnerable to compactness, weight, and optical performance issues. For example, Simple lenses may be prone to aberrations, especially chromatic aberration, and therefore, may not be suitable for precise imaging. Doublets, which are made up of two simple lenses paired together may allow more optical surfaces, thicknesses, and formulations, and thus, provide additional degrees of freedom to correct more optical aberrations and improve image precision. Conventional doublets, which may include oil or similar materials in a gap between the two lenses, may add to weight challenges in a head-mounted display (HMD) device, especially when larger size lenses may be needed to focus display content on an eyebox.

Disclosed herein are systems, apparatuses, and methods that may provide a head-mount display (HMD) device with an optical lens configuration, also referred to as a hollow singlet optical lens structure. In some examples, an optical lens configuration may include two optical elements having a gap in between these two optical elements. In some examples, surfaces of the individual elements may also be provided with any number of optical layers. These may include, but not limited to, a reflective polarizer layer, a quarter wave layer, a semi-transparent mirror, or other optical layer. These optical layers may be used by the optical lens configuration, for example, to help focus visual content on a display of the head-mount display (HMD) system to an eyebox. Furthermore, an example optical lens configuration may include more than two optical elements. Indeed, any practical number of optical elements may be combined with gaps between them.

In some examples, the optical lens configuration may generate optical power through by reflecting surfaces of the cavity between the elements. The two-element optical lens configuration may provide non-chromatic aberration resulting in improved optical imaging quality and increased compactness. Two more refractive surfaces may reduce spherical aberration, coma, astigmatism, and/or field curvature. Furthermore, the optical lens configuration may allow reduced weight for the optical components of the head-mount display (HMD) device. The optical lens configuration may also allow simpler, higher yield production compared to conventional lens systems. Other benefits and advantages may also be apparent.

FIG. 1 illustrates a head-mounted display (HMD) device 100, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements, and may include use of technologies associated with virtual reality (VR), augmented reality (AR), and/or mixed reality (MR). As used herein a "user" may refer to a user or wearer of a "near-eye display."

Head-mounted display (HMD) device 100 shown in FIG. 1 in the perspective view includes a body 102, a front side 104, a bottom side 106, a left side 108, and a head strap 110. In some examples, the head-mounted display (HMD) device 100 may be a part of a virtual reality (VR) system, an augmented reality (AR) system, a mixed reality (MR) system, another system that uses displays or wearables, or any combination thereof. In some examples, the head strap 110 may have an adjustable or extendible length. In particular, in some examples, there may be a sufficient space between the body 102 and the head strap 110 of the head-mounted display (HMD) device 100 for allowing a user to mount the head-mounted display (HMD) device 100 onto the user's head. In some examples, the head-mounted display (HMD) device 100 may include additional, fewer, and/or different components.

In some examples, the head-mounted display (HMD) device 100 may present to a user, media or other digital content including virtual and/or augmented views of a physical, real-world environment with computer-generated elements. Examples of the media or digital content presented by the head-mounted display (HMD) device 100 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 1) enclosed in the body 102 of the head-mounted display (HMD) device 100.

In some examples, where the head-mounted display (HMD) device 100 may provide solely virtual reality (VR) applications, the front side 104 of the body 102 may be opaque as see-through functionality may not be needed for such applications. On the other hand, head-mounted displays (HMDs) providing augmented reality (AR) and/or mixed reality (MR) applications may include a transparent front side 104 to allow the user to see through to the real environment, which may be augmented with artificial content by the respective application. Thus, in any scenario, display optics (i.e., one or more lenses) may be used to focus content from a display in the body 102 and/or the environment to an eyebox.

In some instances, for a head-mounted display (HMD) device (also referred to as "near-eye display system"), it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, the display electronics of the head-mounted display (HMD) device 100 may display or facilitate the display of images to the user according to data received from, for example, a communicatively coupled console or server (not shown in FIG. 1). In some examples, the display electronics may include one or more display panels. In some examples, the display electronics may include any number of pixels to emit light of a predominant color such as red, green, blue, white, or yellow. In some examples, the display electronics may display a three-dimensional (3D) image, e.g., using stereoscopic effects produced by two-dimensional panels, to create a subjective perception of image depth.

In some examples, the display optics may display image content optically (e.g., using optical waveguides and/or couplers) or magnify image light received from the display electronics, correct optical errors associated with the image light, and/or present the corrected image light to a user of the head-mounted display (HMD) device 100. In some examples, the display optics may include a single optical element or any number of combinations of various optical elements as well as mechanical couplings to maintain relative spacing and orientation of the optical elements in the combination. In some examples, one or more optical elements in the display optics may have an optical coating, such as an anti-reflective coating, a reflective coating, a filtering coating, and/or a combination of different optical coatings.

In some examples, the display optics may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

Figure 2:
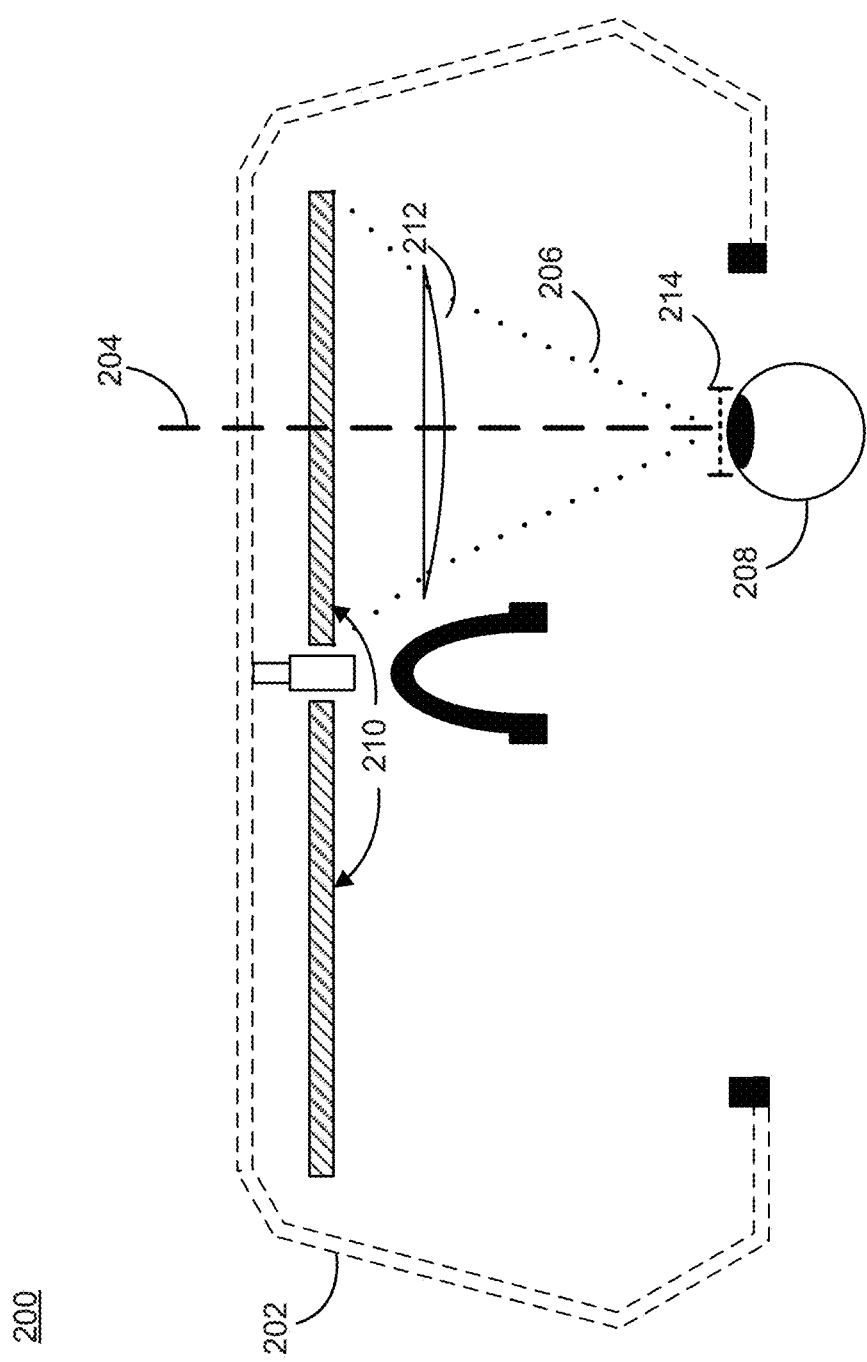
FIG. 2 illustrates a cross section view of simplified version of a head-mounted display (HMD) device 200, according to an example.

FIG. 2 illustrates a cross section view of simplified version of a head-mounted display (HMD) device 200, according to an example. The head-mounted display (HMD) device 200 shown in FIG. 2 with select components for illustration purposes may include a rigid body 202 housing various electronic and optical components, display(s) 210, and optical lens configuration 212. An eye 208 and associated eyebox 214, along with primary optical axis 204 and optical axis 206 are also shown.

In some examples, virtual reality (VR), augmented reality (AR), and/or mixed reality (MR) content may be displayed through display(s) 210 within the head-mounted display (HMD) device 200. The display(s) 210 may be transparent or semi-transparent to allow the user (i.e., the eye 208) to see the environment through the transparent or semi-transparent body 202 of the head-mounted display (HMD) device 200.

In some examples, the optical lens configuration 212 may provide a larger or expanded field of view (FOV) to improve a user's immersive experience. In some examples, the head-mounted display (HMD) device 200, as shown, may include a primary optical axis 204 and an optical axis 206. To a user's eye 208, the primary optical axis 204 may provide a central field of view (FOV) and the tiled optical axis 206 may provide a peripheral field of view (FOV).

In some examples, the content displayed on the display(s) 210 may be focused on the eyebox 214 by the optical lens configuration 212. As shown in the figure, the optical lens configuration 212 may practically expand the optical axis 206 between the optical lens configuration 212 and the display(s) 210 allowing a wider area of content to be focused on the eyebox 214. Single lenses, if used as optical lens configuration 212 may cause chromatic aberration, as discussed previously. An optical lens configuration comprising two lenses with an air gap between them, according to some examples, may, on the other hand, reduce spherical aberration, coma, astigmatism, and/or field curvature by providing additional refractive surfaces. Additionally, the combination of two light-weight lenses in a single structure may allow thinner lenses to be used reducing overall weight of the head-mount display (HMD) device 200. In some examples, the gap between the optical elements of the optical lens configuration 212 may be filled with transparent and light-weight gases and/or liquids such as an inert gas, oxygen, hydrogen, water, oil, etc.

Figure 3:
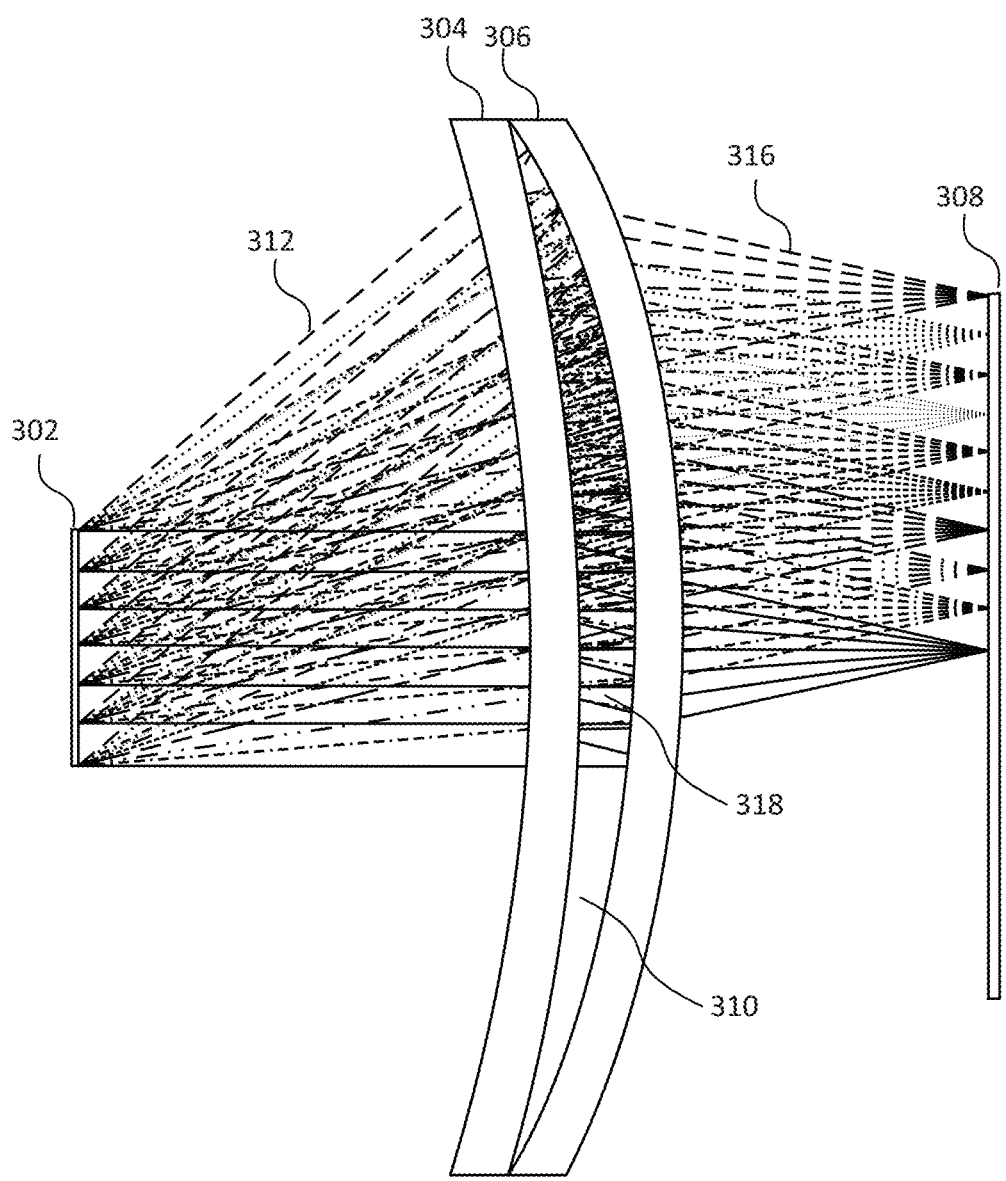
FIG. 3 illustrates focusing of visual content from a display to an eyebox through an optical lens configuration, where the display is smaller than the optical lens configuration, according to an example.

FIG. 3 illustrates focusing of visual content from a display to an eyebox through an optical lens configuration, where the display is smaller than the optical lens configuration, according to an example. Diagram 300 shows light rays 316 from display 308 arriving at a first surface of the optical lens configuration, which may include a first optical element 306 and a second optical element 304 with an air gap 310 between them. Light rays 318 in the air gap 310 are a mixture of refracted and reflected light rays with reflections being caused by a semi-transparent mirror applied to one of the optical element surfaces as discussed in conjunction with FIGS. 6 and 7A-7E. The optical lens configuration may allow the focused light rays 312 (displayed content) to be provided to an eyebox 302 allowing the user to view the entire content on the display 308, which is wider than the eyebox 302.

In some examples, first optical element 304 and second optical element 306 may be selected from a number of optical lens types, including, but not limited to, convex, concave, plano-convex, plano-concave, positive meniscus, or negative meniscus. At least one of the first optical element 304 and second optical element 306 may also be uniform, that is, neither convex, nor concave. In some examples, selected surfaces of the first optical element 304 and second optical element 306 may be provided with a reflective polarizer layer, a quarter wave layer, and/or a semi-transparent mirror to provide polarization adjustment and reflection of the light rays for enhanced optical focus power while keeping the lenses thin (i.e., lightweight).

Figure 4:
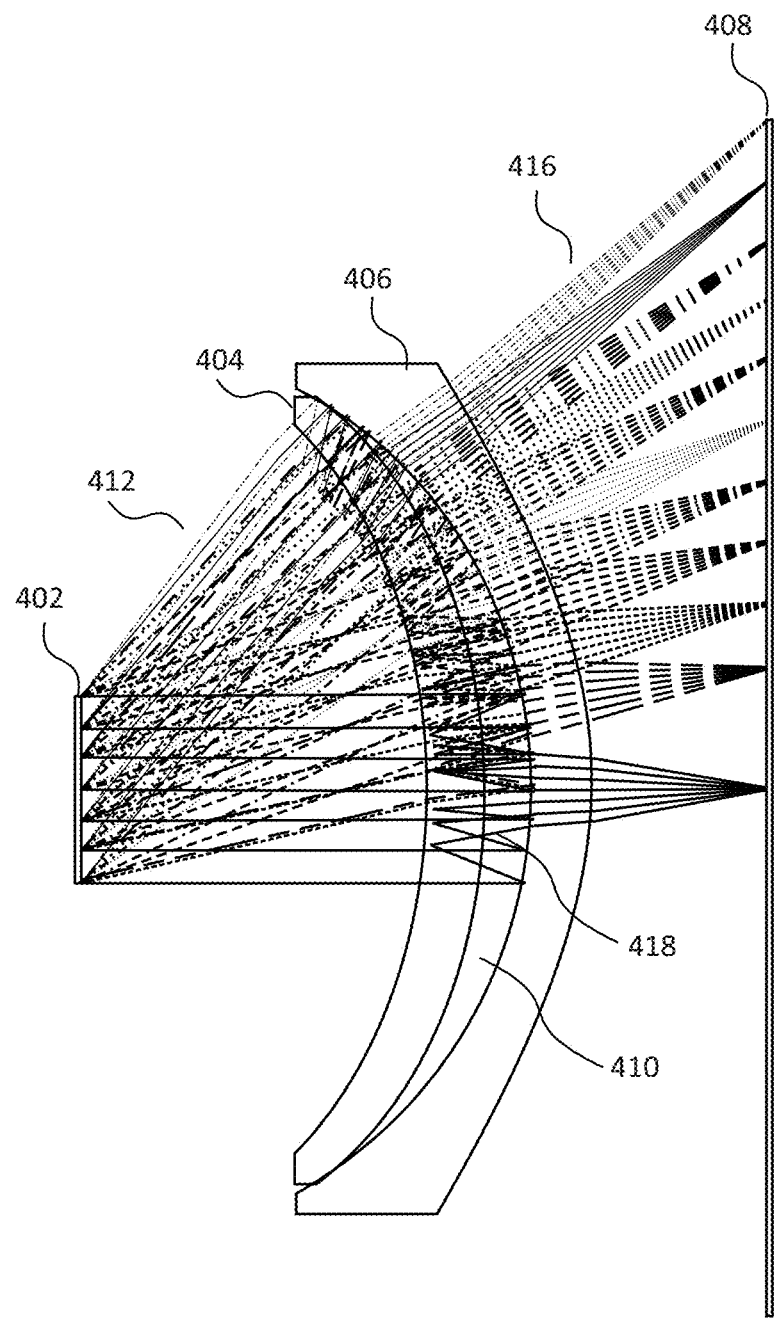
FIG. 4 illustrates focusing of visual content from a display to an eyebox through an optical lens configuration, where the display is larger than the optical lens configuration, according to an example.

FIG. 4 illustrates focusing of visual content from a display to an eyebox through an optical lens configuration, where the display is larger than the optical lens configuration, according to an example. Diagram 400 shows light rays 416 from display 408 arriving at a first surface of the optical lens configuration, which may include a first optical element 406 and a second optical element 404 with an air gap 410 between them. Light rays 418 in the air gap 410 are a mixture of refracted and reflected light rays with reflections being caused by a semi-transparent mirror applied to one of the optical element surfaces as discussed in conjunction with FIGS. 6 and 7A-7E. The optical lens configuration may allow the focused light rays 412 (displayed content) to be provided to an eyebox 402 allowing the user to view the entire content on the display 408.

In some examples, as shown in diagram 400, the first optical element 406 may be a meniscus negative optical lens, that is, the optical lens may function as a concave optical lens, and the second optical element 404 may be a meniscus positive optical lens, that is, the optical lens may function as a convex optical lens. By selecting the shape and strength of the optical elements, a wider display area may be focused on the eyebox 402, as shown in diagram 400. As in FIG. 3, selected surfaces of the first optical element 404 and second optical element 406 may be provided with a reflective polarizer layer, a quarter wave layer, and/or a semi-transparent mirror to provide polarization adjustment and reflection of the light rays for enhanced optical focus power.

Figure 5:
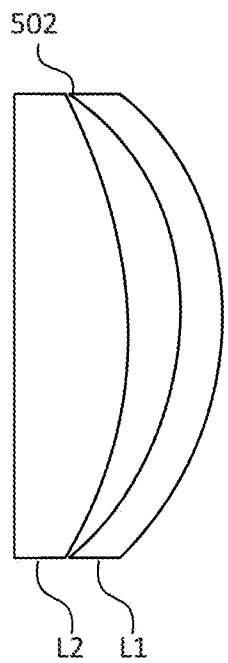
FIG. 5 illustrates a number of optical lens configurations, according to an example.
Figure 5:
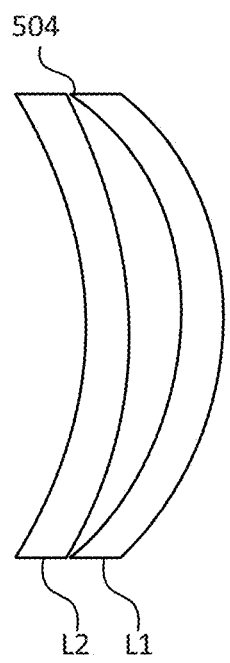
Figure 5:
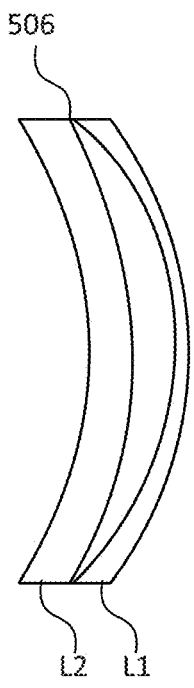
Figure 5:
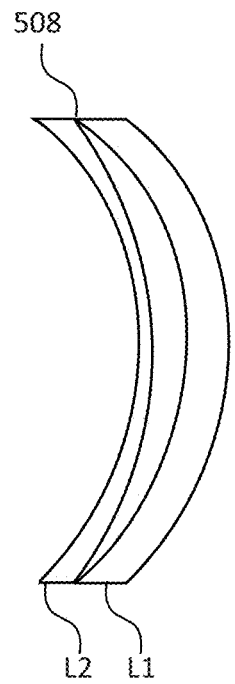
Figure 5:
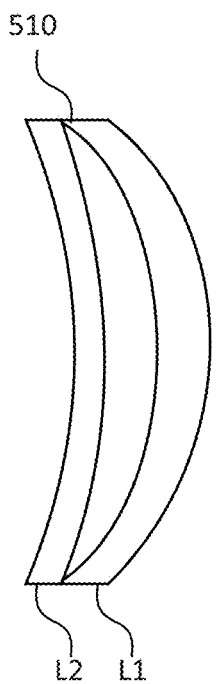
Figure 5:
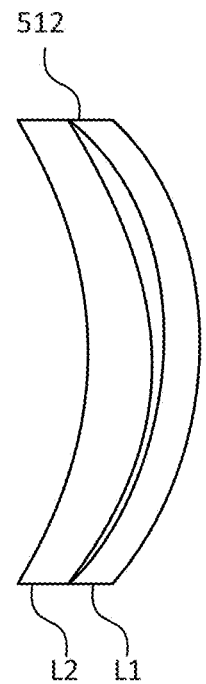

FIG. 5 illustrates a number of optical lens configuration configurations, according to an example. Diagram 500 includes example optical lens configurations 502, 504, 506, 508, 510, and 512, where the first optical element is identified as L1 and the second optical element is identified as L2 in each configuration. In optical lens configuration 502, L1 may be a uniform optical lens and L2 may be a plano convex optical lens. In optical lens configuration 504, L1 and L2, both may be uniform optical lenses. In optical lens configuration 506, L1 may be a meniscus negative optical lens and L2 may be a uniform optical lens. In optical lens configuration 508, L1 may be a uniform optical lens and L2 may be a meniscus negative optical lens. In optical lens configuration 510, L1 may be a meniscus positive optical lens and L2 may be a uniform optical lens. In optical lens configuration 512, L1 may be a uniform optical lens and L2 may be a meniscus positive optical lens.

Optical focus power (also referred to as dioptric, refractive, or convergence power) is a degree to which an optical lens or similar optical system converges or diverges light. Optical focus power is equal to a reciprocal of the focal length of the optical lens or system. High optical focus power may correspond to short focal length. Converging optical lenses such as those typically used in a head-mount display (HMD) device to focus display content on an eyebox may have positive optical focus power. For two or more thin optical lenses close together, the optical focus power of the combined optical lenses may approximately equal to a sum of optical focus powers of each optical lens. Similarly, the optical focus power of a single optical lens (e.g., a meniscus positive optical lens) may be approximately equal to a sum of the optical focus powers of each surface.

In some examples, the additional surfaces of the individual optical lenses in the optical lens configuration may provide refractive surfaces for reduction of spherical aberration, coma, astigmatism, and/or field curvature. Thus, image precision on the eyebox may be improved by the optical lens configuration.

Figure 6:
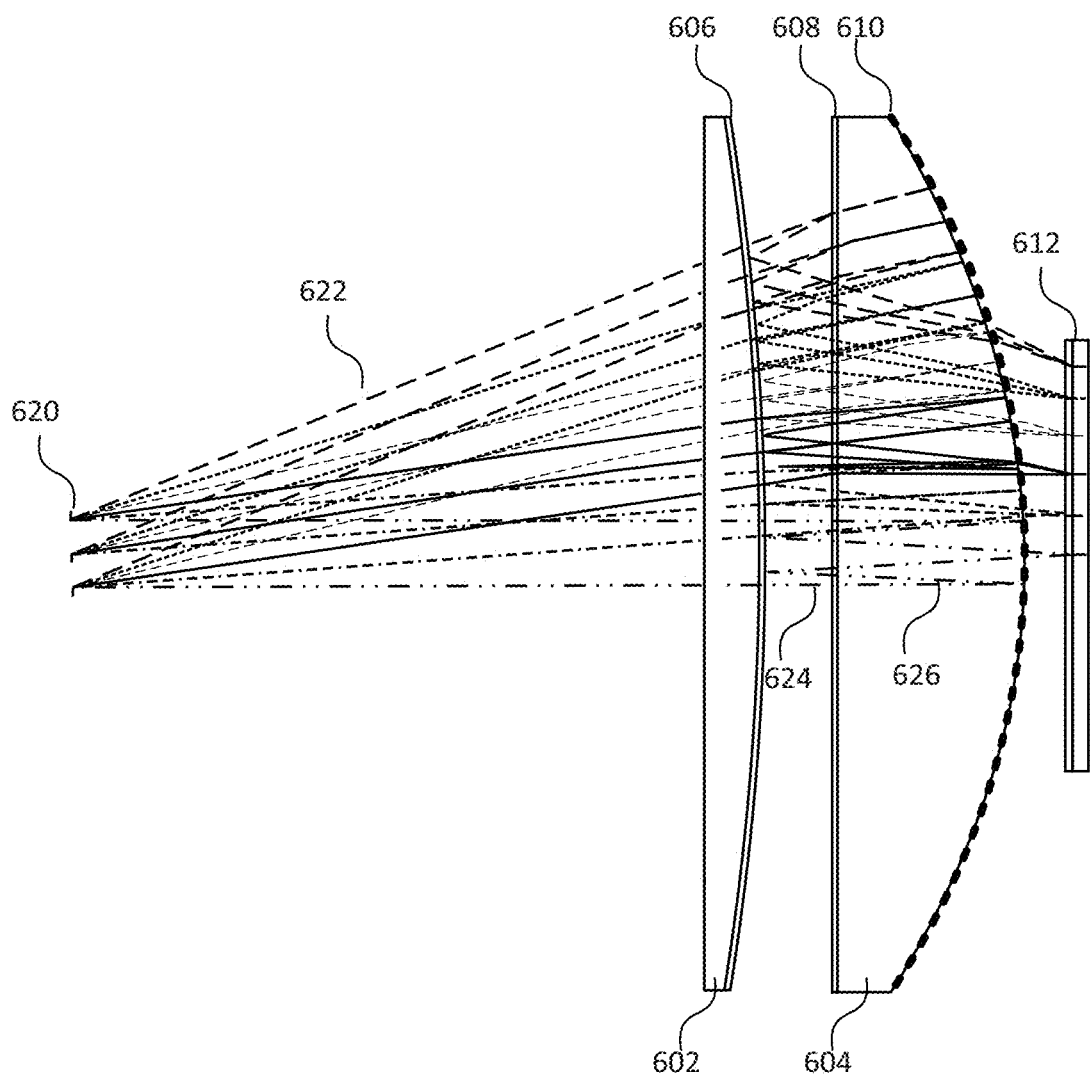
FIG. 6 illustrates details of an optical lens configuration with a reflective polarizer layer, a quarter wave layer, and a semi-transparent mirror, according to an example.

FIG. 6 illustrates details of an optical lens configuration with a reflective polarizer layer, a quarter wave layer, and a semi-transparent mirror, according to an example. The example optical lens configuration in diagram 600 is shown with two optical elements separated for illustration of reflections and refractions. Diagram 600 includes display 612, first optical element 604, second optical element 602, and eyebox 620. A reflective polarizer layer 606 is shown on a first surface of the second optical element 602, a semi-transparent mirror 610 is shown on a first surface of the first optical element 604, and a quarter wave layer 608 is shown on a second surface of the first optical element 604. Light rays 626 passing through the first optical element 604, light rays 624 in the gap between the two optical elements, and light rays 622 arriving at the eyebox 620 are also shown in the diagram 600.

In some examples, the first surface (facing the first optical element 604) of the second optical element 602 may be provided with a reflective polarizer layer 606. In an optical see-through augmented reality (AR) system, polarization management may be critical to improve an ambient contrast ratio and brightness of the display. Traditional polarizing beam splitters (PBSs) used for polarization management may provide remarkable performance, but they may be too bulky and heavy for head-mount display (HMD) devices, whereas compactness and light weight may be sought-after characteristics for head-mounted AR displays. In some examples, a thin reflective polarizer layer 606 may be laminated on the first surface of the second optical element 602 uniformly providing similar performance to the performance of the polarizing beam splitter (PBS). In a reflective polarizer, unpolarized ambient light partially may pass through while polarized display light (e.g., from display 612) may be reflected by the reflective polarizer. Thus, the head-mount augmented reality (AR) system may effectively combine images displayed by the display 612 with the outside world.

However, reflective polarizers—as do the polarizing beam splitters (PBSs)—may have a challenge. In practical implementations, only about half of the unpolarized ambient light may pass through while the other half is reflected back. The decreased transmittance may make it difficult for inconspicuous display systems where the display may need to disappear into the background. In some examples, a quarter wave layer 608 may be provided on a second surface of the first optical element 604 to remedy the transmittance shortcoming of the reflective polarizer layer 606. The quarter wave layer 608 may alter a polarization state of a light wave travelling through it by converting linearly polarized light into circularly polarized light. If unpolarized ambient light is passed through the quarter wave layer 608, it may become linearly or circularly polarized. Thus, transmittance of the ambient light (environment) may be increased through the reflective polarizer layer 606.

Wave plates may be constructed using a birefringent material such as quartz, mica, or plastic, for which the index of refraction may be different for linearly polarized light along one or the other of two certain perpendicular crystal axes. The behavior of a wave plate may depend on a thickness of the crystal, a wavelength of light, and a variation of the index of refraction. Selecting these parameters, a controlled phase shift between two polarization components of a light wave may be introduced, thereby altering the light wave's polarization.

In some examples, a semi-transparent mirror 610 may be provided on a first surface of the first optical element 604. Also called a one-way mirror or a 50/50 mirror, semi-transparent mirrors are reciprocal mirrors that appear reflective on one side and transparent on the other side. While semi-transparent mirrors may be constructed through a number of techniques, one example technique may include coating or encasing glass or similar material with a thin and almost-transparent layer of metal such as aluminum. Reflection of light rays by the quarter wave mirror 610 in a direction of the eyebox 620 may increase an amount of light focused by the optical lens configuration.

In some examples, light from the display may pass through the semi-transparent mirror 610 and become focused by the first optical element 604. As the light exits the first optical element 604, its polarization may be changed as it passes through the quarter wave layer 608. Passing through the gap between the optical elements, the light from the display may pass through the reflective polarizer layer 606 and be further focused by the second optical element 602 arriving at the eyebox 620. Unpolarized light from the environment (in an augmented reality (AR) application) may pass through the semi-transparent mirror 610 and be focused by the first optical element 604. The light from the environment may become at least partially polarized by the quarter wave layer 608 as it exits the first optical element 604. The partially polarized light from the environment may pass through the gap between the optical elements and at least partially pass through the reflective polarizer layer 606 into the second optical element 602, where it may be further focused on the eyebox 620. A portion of the light from the environment, which may be reflected by the reflective polarizer layer 606 may pass through the quarter wave layer 608, first optical element 604, and be reflected back by the semi-transparent mirror 610. As that reflected light becomes further polarized by the quarter wave layer 608, a larger portion may pass through the reflective polarizer layer 606 and arrive at the eyebox 620. Thus, a loss of light from the environment for the augmented reality (AR) application may be substantially reduced.

In some examples, an optical lens configuration may include an assembly of two optical elements attached together with an air gap in-between. Optical materials may be subject to chromatic dispersion, which may cause scattering of a signal at different wavelengths. An example optical lens configuration may utilize two complementary dispersing optical elements to compensate the chromatic dispersion and have a resulting optical lens configuration with similar focusing power over the entire wavelength range. Thus, an achromatic optical lens configuration may limit effects of chromatic and spherical aberration. In some examples, one of the optical elements may be a negative (concave) element with relatively high dispersion, and the other optical element may be a positive (convex) element with lower dispersion. Other configurations may also be implemented. While conventional doublet lens structures commonly utilize two lenses cemented together without a gap or a liquid (e.g., oil) filled gap, such implementations may fail to address the challenge of size and weight in a head-mount display (HMD) device. An example, optical lens configuration with the air gap between the two optical elements may allow thinner, lighter optical lenses to be used with lower overall weight and may also be easier to manufacture. For example, the optical lens configuration may be formed by affixing the two optical elements mechanically or chemically (e.g., gluing) along their peripheral edges. In some examples, an inert gas or similar may also be used to fill the gap instead of air.

In diagram 600, the first optical element 604 and the second optical element 602 are shown as plano-convex optical lenses, but implementations are not limited to this configuration. Other optical lens types may also be selected using the principles discussed herein. Furthermore, the reflective polarizer layer 606, the quarter wave layer 608, and the semi-transparent mirror 610 are shown on specific surfaces of the first optical element 604 and the second optical element 602. Examples are not limited to these configurations. As discussed in conjunction with FIGS. 7A-7E, the three light treatment layers may be provided in other configurations too.

Figure 7A:
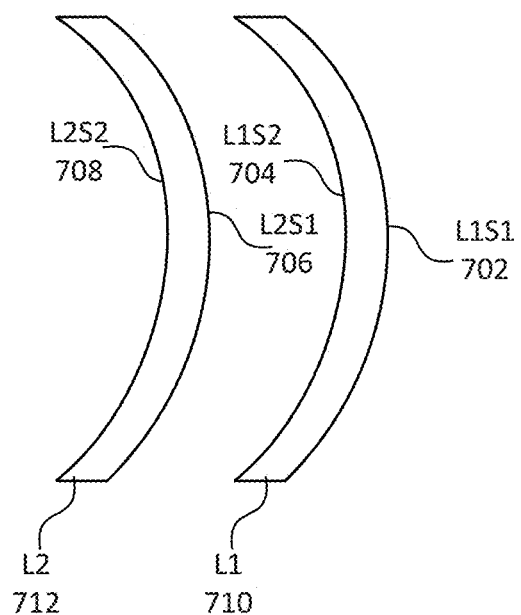
FIGS. 7A-7E illustrate a number of configurations of reflective polarizer layer, quarter wave layer, and semi-transparent mirror in an optical lens configuration, according to an example.

FIGS. 7A-7E illustrate a number of configurations of reflective polarizer layer, quarter wave layer, and semi-transparent mirror in an optical lens configuration, according to an example. Diagram 700A of FIG. 7A shows an example two-element configuration to serve as legend for the example configurations of light treatment layers in FIGS. 7B-7E. In diagram 700A, a first optical element (L1) 710 and a second optical element (L2) 712 are shown as uniform optical lenses for simplicity purposes. As discussed herein, both optical elements may include any optical lens type depending on the overall optical lens configuration construction. A first surface (facing a display) 702 of the first optical element (L1) 710 may be designated as L1S1. A second surface (facing toward an eyebox) 704 of the first optical element (L1) 710 may be designated as L1S2. A first surface (facing toward the display) 706 of the second optical element (L2) 712 may be designated as L2S1. A second surface (facing the eyebox) 708 of the second optical element (L2) 712 may be designated as L2S2.

Figure 7B:
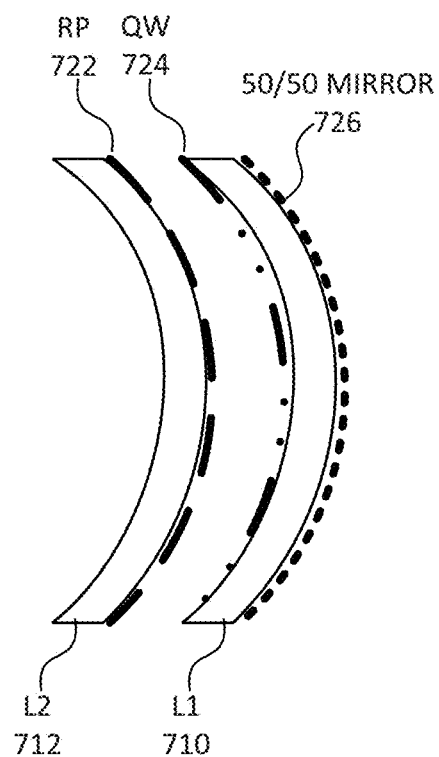

Diagram 700B of FIG. 7B shows a first example configuration, where a reflective polarizer layer (RP) 722 may be provided on a first surface of the second optical element (L2S1), a quarter wave layer (QW) 724 may be provided on a second surface of the first optical element (L1S2), and a semi-transparent mirror (50/50 mirror) 726 may be provided on a first surface of the first optical element (L1S1).

Figure 7C:
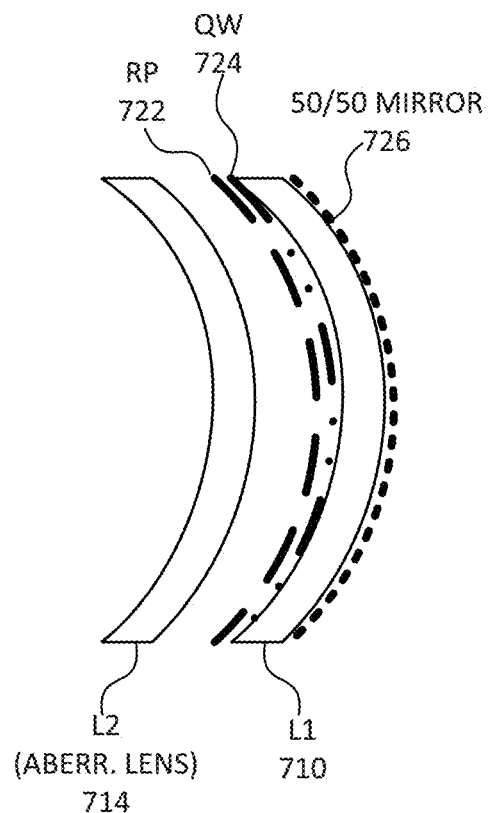

Diagram 700C of FIG. 7C shows a second example configuration, where the quarter wave layer (QW) 724 may be provided on the second surface of the first optical element (L2S1), the reflective polarizer layer (RP) 722 may be provided on the quarter wave layer (QW) 724, and the semi-transparent mirror (50/50 mirror) 726 may be provided on the first surface of the first optical element (L1S1). In this configuration, the second optical element (L2) 714 may function as an aberration correction lens.

Figure 7D:
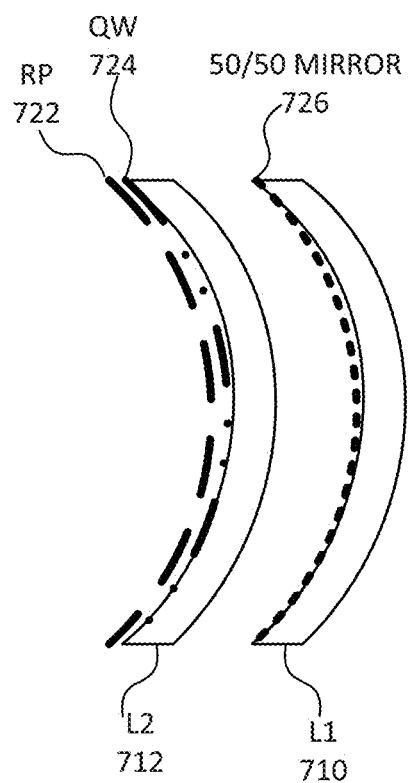

Diagram 700D of FIG. 7D shows a third example configuration, where the quarter wave layer (QW) 724 may be provided on the second surface of the second optical element (L2S2), the reflective polarizer layer (RP) 722 may be provided on the quarter wave layer (QW) 724, and the semi-transparent mirror (50/50 mirror) 726 may be provided on the second surface of the first optical element (L2S1).

Figure 7E:
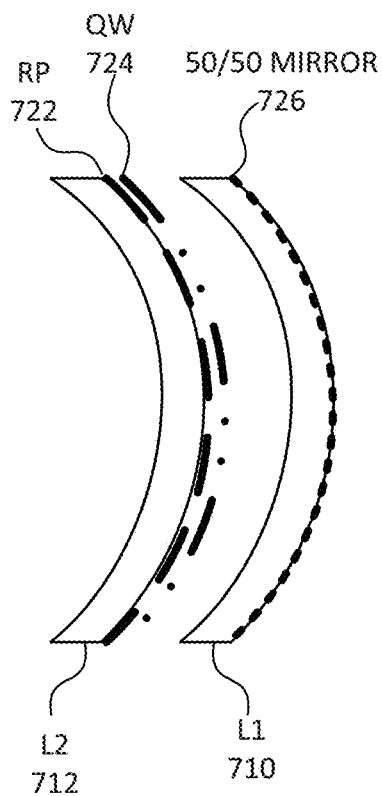

Diagram 700E of FIG. 7E shows a fourth example configuration, where the reflective polarizer layer (RP) 722 may be provided on the first surface of the second optical element (L1S2), the quarter wave layer (QW) 724 may be provided on the reflective polarizer layer (RP) 722, and the semi-transparent mirror (50/50 mirror) 726 may be provided on the first surface of the first optical element (L1S1).

As discussed in conjunction with FIG. 6, the shapes and types of the individual optical elements and placement of the light treatment layers may be selected in other configurations different from the ones shown in FIGS. 7B-7E using the principles described herein.

Figure 8:
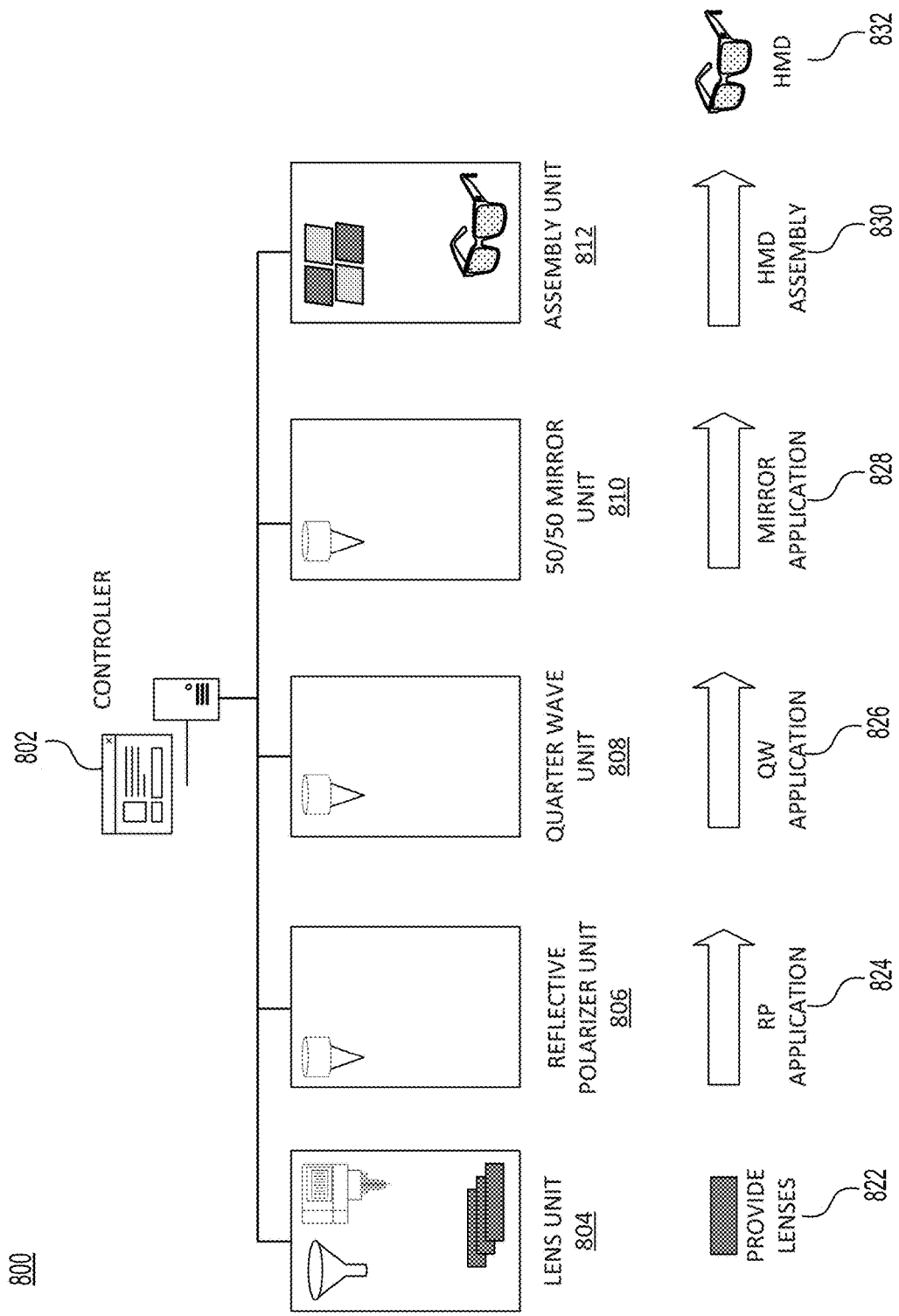
FIG. 8 illustrates an assembly system to provide a head-mount display (HMD) device with an optical lens configuration, according to an example.

FIG. 8 illustrates an assembly system to provide a head-mount display (HMD) device with an optical lens configuration, according to an example. Diagram 800 shows a controller 802 managing operations of individual assembly units including a lens unit 804, a reflective polarizer unit 896, a quarter wave unit 808, a semi-transparent (50/50) mirror unit 810, and an assembly unit 812. Individual optical elements (e.g., first optical element and second optical element) may be provided (822) by the lens unit 804 followed by application of the reflective polarizer layer (824) by the reflective polarizer unit 806 on one of the surfaces of one of the optical elements. A quarter wave layer may be applied to one of the surfaces of one of the optical elements or over the reflective polarizer layer by quarter wave unit 808 followed by application of the semi-transparent mirror (826) on one of the surfaces of one of the optical elements by the semi-transparent (50/50) mirror unit 810. The treated lenses may be assembled (830) together to form an optical lens configuration and then assembled together with the remaining components of the head-mount display (HMD) device 832 by the assembly unit 812.

In some examples, the lens unit 804 may provide the optical elements (e.g., first optical element and second optical element) using any suitable optical material, but not limited to, glass, optical grade plastics such as poly-methyl-methacrylate (PMMA), cyclic-olefin-copolymer (COC), cyclo-olefin-polymer (COP), monomer plastic, polymer plastic, polycarbonate (PC), epoxy, polyester, optical nylon, etc. The optical elements may be provided using casting, injection molding, compression molding, machining, polishing, and/or similar methods or techniques.

In some examples, the reflective polarizer unit 806 may provide the reflective polarizer layer on a surface of one of the optical elements using birefringent material such as calcite, linear polymer film (e.g., polyvinyl alcohol "PVA" based), a modified polycarbonate, or similar. The reflective polarizer layer may be provided using lamination, spraying, and/or similar methods or techniques. In some examples, a wire grid reflective polarizer with metal materials such as silver, titanium, steel, etc. may also be used as reflective polarizer layer. Furthermore, a holographic interference generated pattern by photoresistor and various polymers may also be applied.

In some examples, the quarter wave unit 808 may provide the quarter wave layer on a surface of the optical elements (or on the reflective polarizer layer) using materials such as quartz (crystalline SiO2), mica, modified polycarbonates, or liquid crystal polymers. Additional materials which may be used to form a quarter wave layer may include, but are not limited to, zircon (ZrSiO2), rutile (TiO2), calcite (CaCO3), tourmaline, sodium-nitrate-beryl (Be3Al2(Si)3)6), topaz, feldspar, and similar. The quarter wave layer may be formed as a separate layer and laminated or otherwise affixed to the surface of the optical element or the reflective polarizer layer as a thickness of the quarter wave layer is a critical characteristic that may need to be adjusted with high precision.

In some examples, the semi-transparent (50/50) mirror unit 810 may provide the semi-transparent mirror on a surface of one of the optical elements by applying a thin layer of metal (e.g., aluminum, silver, gold, or similar) onto a thin layer of glass or a transparent polymer material, and then laminating or similarly affixing the mirror to the optical element surface. In other examples, the mirror may be formed on the surface of the optical element layer by layer by using suitable application techniques such as injection, lamination, spraying, vapor deposition, etc.

As discussed herein, an optical lens configuration may include an assembly of two optical elements attached together with an air gap in-between. Contrary to conventional doublet lens structures, which commonly utilize two lenses cemented together without a gap or a liquid (e.g., oil) filled gap, an example, optical lens configuration may be assembled by affixing the two optical elements mechanically or chemically (e.g., gluing) along their peripheral edges. In some examples, an inert gas or similar may also be used to fill the gap instead of air.

The modules (stations) of an example head-mount display (HMD) assembly system to produce head-mount display (HMD) devices with optical lens configurations as described herein are for illustration purposes and do not imply limitations on the assembly system. Some of the modules may be implemented as a single station performing any number of functions at any number of stages of assembly. An order of the modules (i.e., assembly steps) may be different than shown in the diagram. The assembly system may also be implemented using fewer or additional modules using the principles described herein.

Figure 9:
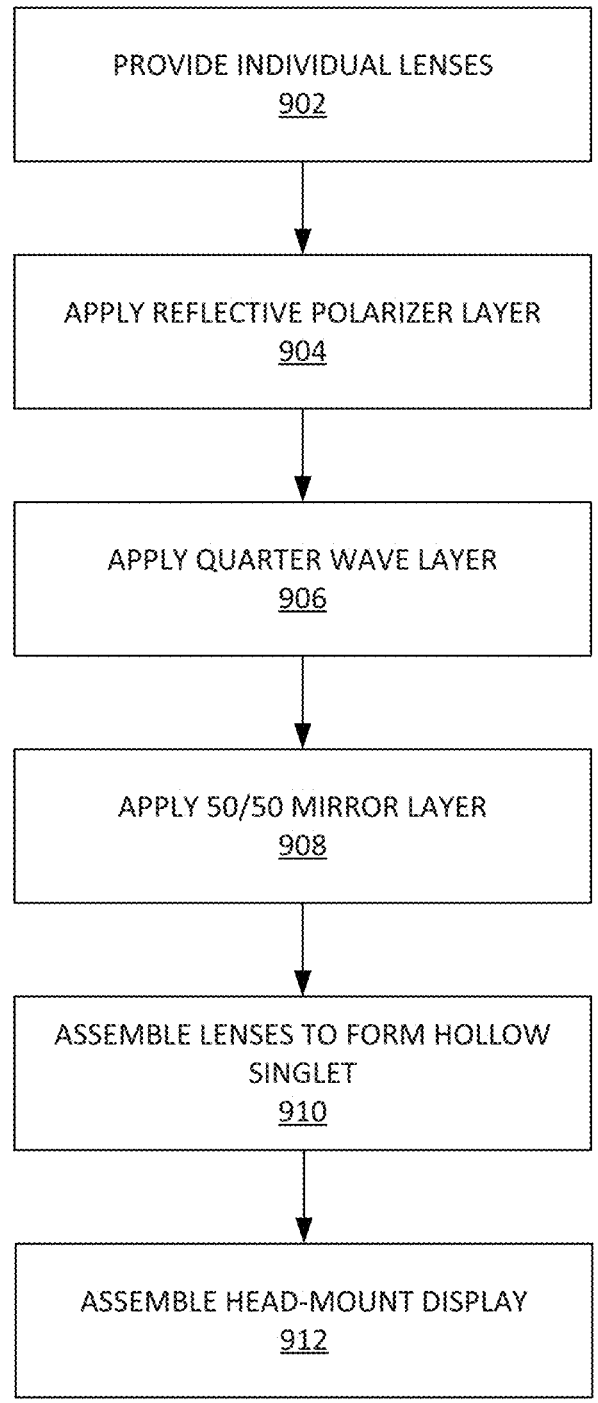
FIG. 9 illustrates a flowchart of a method to assemble a head-mount display (HMD) device with an optical lens configuration, according to an example.

FIG. 9 illustrates a flowchart of a method to assemble a head-mount display (HMD) device with an optical lens configuration, according to an example. Each block shown in FIG. 9 may further represent one or more processes, methods, or subroutines, and one or more of the blocks may include machine-readable instructions stored on a non-transitory computer readable medium and executed by a processor or other type of processing circuit to perform one or more operations described herein.

At 902, first optical element (L1) 710 and second optical element (L2) 712 may be provided using any suitable optical material, but not limited to, glass, optical grade plastics such as poly-methyl-methacrylate (PMMA), cyclic-olefin-copolymer (COC), cyclo-olefin-polymer (COP), monomer plastic, polymer plastic, polycarbonate (PC), epoxy, polyester, optical nylon, etc. The optical elements may be provided using casting, injection molding, compression molding, machining, polishing, and/or similar methods or techniques. At 904, the reflective polarizer layer 722 may be provided on a surface of either the first optical element (L1) 710 or the second optical element (L2) 712 using lamination, spraying, and/or similar methods or techniques.

At 906, the quarter wave layer 724 may be provided on one of the surfaces of either the first optical element (L1) 710 or the second optical element (L2) 712 or on the reflective polarizer layer 722. The quarter wave layer 724 may be formed as a separate layer and laminated or otherwise affixed to the surface of one of the optical elements or the reflective polarizer layer. At 908, the semi-transparent mirror 726 may be provided on one of the surfaces of either the first optical element (L1) 710 or the second optical element (L2) 712 by applying a thin layer of metal (e.g., aluminum, silver, gold, or similar) onto a thin layer of glass or a transparent polymer material, and then laminating or similarly affixing the mirror to the optical element surface.

At 910, the treated optical elements (with the reflective polarizer layer 722, the quarter wave layer 724, and the semi-transparent mirror 726) may be assembled together to form the optical lens configuration. The optical lens configuration may be assembled by affixing the two optical elements mechanically or chemically (e.g., gluing) along their edges. In some examples, an inert gas or similar may also be used to fill the gap instead of air. At 912, the head-mount display (HMD) device 832 may be assembled by combining any number of electronic, mechanical, and optical parts such as the optical lens configuration, body 102, head strap 110, and other components.

According to some examples, an optical lens assembly may include an optical lens configuration with a first optical element and a second optical element, where the first optical element and the second optical element may be affixed together along a peripheral edge to form a gap between the first optical element and the second optical element. The first optical element may include a first surface of a first optical lens type (L1S1) and a second surface of the first optical lens type (L1S2), and the second optical element may include a first surface of a second optical lens type (L2S1) and a second surface of the second optical element type (L2S2). The first optical element the second optical element may compensate chromatic dispersion characteristics.

According to some examples, the optical lens assembly may further include a reflective polarizer layer provided on one of the second surface of the first optical lens type (L1S2), the first surface of the second optical lens type (L2S1), or the second surface of the second optical lens type (L2S2); a quarter wave layer provided on one of the second surface of the first optical lens type (L1S2), the first surface of the second optical lens type (L2S1), the second surface of the second optical lens type (L2S2), or the reflective polarizer layer; and a semi-transparent mirror provided on one of the first surface of the first optical lens type (L1S1) or the second surface of the first optical lens type (L1S2).

According to some examples, the reflective polarizer layer may include calcite or a linear polymer film; and the quarter wave layer may include one or more of quartz (crystalline SiO2), mica, or a modified polycarbonate. The reflective polarizer layer may be provided on the first surface of the second optical lens type (L2S1), the quarter wave layer may be provided on the second surface of the first optical lens type (L1S2), and the semi-transparent mirror may be provided on the first surface of the first optical lens type (L1S1). Alternatively, the quarter wave layer may be provided on the second surface of the first optical lens type (L1S2), the reflective polarizer layer may be provided on the quarter wave layer, and the semi-transparent mirror may be provided on the first surface of the first optical lens type (L1S1). Alternatively, the quarter wave layer may be provided on the second surface of the second optical lens type (L2S2), the reflective polarizer layer may be provided on the quarter wave layer, and the semi-transparent mirror may be provided on the second surface of the first optical lens type (L1S2). Alternatively, the reflective polarizer layer may be provided on the first surface of the second optical lens type (L2S1), the quarter wave layer may be provided on the reflective polarizer layer, and the semi-transparent mirror may be provided on the first surface of the first optical lens type (L1S1).

According to some examples, the first optical element and the second optical element may be provided using at least one of glass, poly-methyl-methacrylate (PMMA), cyclic-olefin-copolymer (COC), cyclo-olefin-polymer (COP), monomer plastic, polymer plastic, polycarbonate (PC), epoxy, polyester, or optical nylon by casting, injection molding, compression molding, machining, or polishing. The gap may be filled with air or an inert gas. The first optical lens type and the second optical lens type, each, may be convex, concave, plano-convex, plano-concave, positive meniscus, or negative meniscus.

According to some examples, a head-mount display (HMD) device may include a body with a transparent or semi-transparent front side; a display to present augment reality (AR) or mixed reality (MR) content; and an optical lens assembly to focus light incident to the front side from an environment and light from the display to an eyebox. The optical lens assembly may include a first optical element with a first surface of a first optical lens type (L1S1) and a second surface of the first optical lens type (L1S2). A second optical element may include a first surface of a second optical lens type (L2S1) and a second surface of the second optical element type (L2S2), where the first optical lens type and the second optical lens type may be selected at least in part to compensate chromatic dispersion characteristics of the first optical element and the second optical element. The first optical element and the second optical element may be affixed together along a peripheral edge to form a gap between the first optical element and the second optical element.

According to some examples, the head-mount display (HMD) device may further include a reflective polarizer layer provided on one of the second surface of the first optical lens type (L1S2), the first surface of the second optical lens type (L2S1), or the second surface of the second optical lens type (L2S2); a quarter wave layer provided on one of the second surface of the first optical lens type (L1S2), the first surface of the second optical lens type (L2S1), the second surface of the second optical lens type (L2S2), or the reflective polarizer layer; and a semi-transparent mirror provided on one of the first surface of the first optical lens type (L1S1) or the second surface of the first optical lens type (L1S2). The reflective polarizer layer may include calcite or a linear polymer film; and the quarter wave layer may include one or more of quartz (crystalline SiO2), mica, or a modified polycarbonate.

According to some examples, the reflective polarizer layer may be provided on the first surface of the second optical lens type (L2S1), the quarter wave layer may be provided on the second surface of the first optical lens type (L1S2), and the semi-transparent mirror may be provided on the first surface of the first optical lens type (L1S1). Alternatively, the quarter wave layer may be provided on the second surface of the first optical lens type (L1S2), the reflective polarizer layer may be provided on the quarter wave layer, and the semi-transparent mirror may be provided on the first surface of the first optical lens type (L1S1). Alternatively, the quarter wave layer may be provided on the second surface of the second optical lens type (L2S2), the reflective polarizer layer may be provided on the quarter wave layer, and the semi-transparent mirror may be provided on the second surface of the first optical lens type (L1S2). Alternatively, the reflective polarizer layer may be provided on the first surface of the second optical lens type (L2S1), the quarter wave layer may be provided on the reflective polarizer layer, and the semi-transparent mirror may be provided on the first surface of the first optical lens type (L1S1).

According to some examples, the first optical element and the second optical element may be provided using at least one of glass, poly-methyl-methacrylate (PMMA), cyclic-olefin-copolymer (COC), cyclo-olefin-polymer (COP), monomer plastic, polymer plastic, polycarbonate (PC), epoxy, polyester, or optical nylon by casting, injection molding, compression molding, machining, or polishing. The gap may be filled with air or an inert gas. The first optical lens type and the second optical lens type, each, may be convex, concave, plano-convex, plano-concave, positive meniscus, or negative meniscus.

According to some examples, a method to provide an optical lens assembly may include providing a first optical element with a first surface of a first optical lens type (L1S1) and a second surface of the first optical lens type (L1S2); providing a second optical element with a first surface of a second optical lens type (L2S1) and a second surface of the second optical element type (L2S2), where the first optical element the second optical element may compensate chromatic dispersion characteristics; and affixing the first optical element the second optical element together along a peripheral edge to form a gap between the first optical element the second optical element.

According to some examples, the method may further include providing a reflective polarizer layer on one of the second surface of the first optical lens type (L1S2), the first surface of the second optical lens type (L2S1), or the second surface of the second optical lens type (L2S2); providing a quarter wave layer on one of the second surface of the first optical lens type (L1S2), the first surface of the second optical lens type (L2S1), the second surface of the second optical lens type (L2S2), or the reflective polarizer layer; and providing a semi-transparent mirror on one of the first surface of the first optical lens type (L1S1) or the second surface of the first optical lens type (L1S2). The method may also include providing the reflective polarizer layer using calcite or a linear polymer film; and providing the quarter wave layer using one or more of quartz (crystalline SiO2), mica, or a modified polycarbonate.

According to some examples, the method may further include providing the reflective polarizer layer on the first surface of the second optical lens type (L2S1), the quarter wave layer on the second surface of the first optical lens type (L1S2), and the semi-transparent mirror on the first surface of the first optical lens type (L1S1). Alternatively, the method may further include providing the quarter wave layer on the second surface of the first optical lens type (L1S2), the reflective polarizer layer on the quarter wave layer, and the semi-transparent mirror on the first surface of the first optical lens type (L1S1). Alternatively, the method may further include providing the quarter wave layer on the second surface of the second optical lens type (L2S2), the reflective polarizer layer on the quarter wave layer, and the semi-transparent mirror on the second surface of the first optical lens type (L1S2). Alternatively, the method may further include providing the reflective polarizer layer on the first surface of the second optical lens type (L2S1), the quarter wave layer on the reflective polarizer layer, and the semi-transparent mirror on the first surface of the first optical lens type (L1S1).

According to some examples, the method may also include filling the gap with air or an inert gas. Providing the first optical element and the second optical element may include selecting the first optical lens type and the second optical lens type, each, from one of convex, concave, plano-convex, plano-concave, positive meniscus, or negative meniscus.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to focusing of displayed digital content, such as videos or interactive media, it should be appreciated that the methods and systems as described herein may be used for other types of content or scenarios as well.

The invention claimed is:
1. An optical lens assembly, comprising:
an optical lens configuration comprising a first optical element and a second optical element, wherein:

the first optical element and the second optical element are affixed together along a peripheral edge to form a gap between the first optical element and the second optical element;

the first optical element comprising a first surface of a first optical lens type (L1S1) and a second surface of the first optical lens type (L1S2);

the second optical element comprising a first surface of a second optical lens type (L2S1) and a second surface of the second optical lens type (L2S2);

the first optical element the second optical element are configured to compensate chromatic dispersion characteristics;

a reflective polarizer layer provided on one of the second surface of the first optical lens type (L1S2), the first surface of the second optical lens type (L2S1), or the second surface of the second optical lens type (L2S2);

a quarter wave layer provided on one of the second surface of the first optical lens type (L1S2), the first surface of the second optical lens type (L2S1), the second surface of the second optical lens type (L2S2), or the reflective polarizer layer; and a semi-transparent mirror provided on one of the first surface of the first optical lens type (L1S1) or the second surface of the first optical lens type (L1S2).

2. The optical lens assembly of claim 1, wherein
the reflective polarizer layer comprises calcite or a linear polymer film; and
the quarter wave layer comprises one or more of quartz (crystalline SiO2), mica, or a modified polycarbonate.

3. The optical lens assembly of claim 1, wherein
the reflective polarizer layer is provided on the first surface of the second optical lens type (L2S1), the quarter wave layer is provided on the second surface of the first optical lens type (L1S2), and the semi-transparent mirror is provided on the first surface of the first optical lens type (L1S1);

the quarter wave layer is provided on the second surface of the first optical lens type (L1S2), the reflective polarizer layer is provided on the quarter wave layer, and the semi-transparent mirror is provided on the first surface of the first optical lens type (L1S1);

the quarter wave layer is provided on the second surface of the second optical lens type (L2S2), the reflective polarizer layer is provided on the quarter wave layer, and the semi-transparent mirror is provided on the second surface of the first optical lens type (L1S2); or the reflective polarizer layer is provided on the first surface of the second optical lens type (L2S1), the quarter wave layer is provided on the reflective polarizer layer, and the semi-transparent mirror is provided on the first surface of the first optical lens type (L1S1).

4. The optical lens assembly of claim 1, wherein the first optical element and the second optical element are provided using at least one of glass, poly-methyl-methacrylate (PMMA), cyclic-olefin-copolymer (COC), cyclo-olefin-polymer (COP), monomer plastic, polymer plastic, polycarbonate (PC), epoxy, polyester, or optical nylon by casting, injection molding, compression molding, machining, or polishing.

5. The optical lens assembly of claim 1, wherein the gap is filled with air or an inert gas.

6. The optical lens assembly of claim 1, wherein the first optical lens type and the second optical lens type, each, comprise one of convex, concave, plano-convex, plano-concave, positive meniscus, or negative meniscus.

7. The optical lens assembly of claim 1, wherein the quarter wave layer is formed as a separate layer and affixed to a surface of the first optical element.

8. A head-mount display (HMD) device comprising:
a body comprising a transparent or semi-transparent front side;
a display to present augment reality (AR) or mixed reality (MR) content;
an optical lens assembly to focus light incident to a front side from an environment and light from the display to an eyebox, the optical lens assembly comprising:
a first optical element comprising a first surface of a first optical lens type (L1S1) and a second surface of the first optical lens type (L1S2); and
a second optical element comprising a first surface of a second optical lens type (L2S1) and a second surface of the second optical lens type (L2S2), wherein
the first optical lens type and the second optical lens type are selected at least in part to compensate chromatic dispersion characteristics of the first optical element and the second optical element, and
the first optical element and the second optical element are affixed together along a peripheral edge to form a gap between the first optical element and the second optical element;
a reflective polarizer layer provided on one of the second surface of the first optical lens type (L1S2), the first surface of the second optical lens type (L2S1), or the second surface of the second optical lens type (L2S2);
a quarter wave layer provided on one of the second surface of the first optical lens type (L1S2), the first surface of the second optical lens type (L2S1), the second surface of the second optical lens type (L2S2), or the reflective polarizer layer; and
a semi-transparent mirror provided on one of the first surface of the first optical lens type (L1S1) or the second surface of the first optical lens type (L1S2).

9. The head-mount display (HMD) device of claim 8, wherein
the reflective polarizer layer comprises calcite or a linear polymer film; and
the quarter wave layer comprises one or more of quartz (crystalline SiO2), mica, or a modified polycarbonate.

10. The head-mount display (HMD) device of claim 8, wherein
the reflective polarizer layer is provided on the first surface of the second optical lens type (L2S1), the quarter wave layer is provided on the second surface of the first optical lens type (L1S2), and the semi-transparent mirror is provided on the first surface of the first optical lens type (L1S1);

the quarter wave layer is provided on the second surface of the first optical lens type (L1S2), the reflective polarizer layer is provided on the quarter wave layer, and the semi-transparent mirror is provided on the first surface of the first optical lens type (L1S1);

the quarter wave layer is provided on the second surface of the second optical lens type (L2S2), the reflective polarizer layer is provided on the quarter wave layer, and the semi-transparent mirror is provided on the second surface of the first optical lens type (L1S2); or the reflective polarizer layer is provided on the first surface of the second optical lens type (L2S1), the quarter wave layer is provided on the reflective polarizer layer, and the semi-transparent mirror is provided on the first surface of the first optical lens type (L1S1).

11. The head-mount display (HMD) device of claim 8, wherein the first optical element and the second optical element are provided using at least one of glass, poly-methyl-methacrylate (PMMA), cyclic-olefin-copolymer (COC), cyclo-olefin-polymer (COP), monomer plastic, polymer plastic, polycarbonate (PC), epoxy, polyester, or optical nylon by casting, injection molding, compression molding, machining, or polishing.

12. The head-mount display (HMD) device of claim 8, wherein the gap is filled with air or an inert gas.

13. The head-mount display (HMD) device of claim 8, wherein the first optical lens type and the second optical lens type, each, comprise one of convex, concave, plano-convex, plano-concave, positive meniscus, or negative meniscus.

14. The head-mount display (HMD) device of claim 8, wherein the quarter wave layer is formed as a separate layer and affixed to a surface of the first optical element.

15. A method to provide an optical lens assembly, the method comprising:
provide a first optical element comprising a first surface of a first optical lens type (L1S1) and a second surface of the first optical lens type (L1S2);
providing a second optical element comprising a first surface of a second optical lens type (L2S1) and a second surface of the second optical lens type (L2S2), wherein the first optical element the second optical element are configured to compensate chromatic dispersion characteristics;
affixing the first optical element the second optical element together along a peripheral edge to form a gap between the first optical element the second optical element;
providing a reflective polarizer layer on one of the second surface of the first optical lens type (L1S2), the first surface of the second optical lens type (L2S1), or the second surface of the second optical lens type (L2S2);
providing a quarter wave layer on one of the second surface of the first optical lens type (L1S2), the first surface of the second optical lens type (L2S1), the second surface of the second optical lens type (L2S2), or the reflective polarizer layer; and providing a semi-transparent mirror on one of the first surface of the first optical lens type (L1S1) or the second surface of the first optical lens type (L1S2).

16. The method of claim 15, further comprising:
providing the reflective polarizer layer using calcite or a linear polymer film; and
providing the quarter wave layer using one or more of quartz (crystalline SiO2), mica, or a modified polycarbonate.

17. The method of claim 15, further comprising:
providing the reflective polarizer layer on the first surface of the second optical lens type (L2S1), the quarter wave layer on the second surface of the first optical lens type (L1S2), and the semi-transparent mirror on the first surface of the first optical lens type (L1S1);
providing the quarter wave layer on the second surface of the first optical lens type (L1S2), the reflective polarizer layer on the quarter wave layer, and the semi-transparent mirror on the first surface of the first optical lens type (L1S1);
the quarter wave layer on the second surface of the second optical lens type (L2S2), the reflective polarizer layer on the quarter wave layer, and the semi-transparent mirror on the second surface of the first optical lens type (L1S2); or
providing the reflective polarizer layer on the first surface of the second optical lens type (L2S1), the quarter wave layer on the reflective polarizer layer, and the semi-transparent mirror on the first surface of the first optical lens type (L1S1).

18. The method of claim 15, further comprising:
filling the gap with air or an inert gas.

19. The method of claim 15, wherein providing the first optical element and the second optical element comprises selecting the first optical lens type and the second optical lens type, each, from one of convex, concave, plano-convex, plano-concave, positive meniscus, or negative meniscus.

20. The method of claim 15, wherein the quarter wave layer is formed as a separate layer and affixed to a surface of the first optical element.

* * * * *